United States Patent
Kezys et al.

(10) Patent No.: US 12,255,741 B1
(45) Date of Patent: *Mar. 18, 2025

(54) METHOD AND SYSTEM FOR PRESERVING A FRAME CHECK SEQUENCE DURING BACKSCATTER COMMUNICATION

(71) Applicant: HaiLa Technologies Inc., Montreal (CA)

(72) Inventors: Vytas Kezys, Montreal (CA); Juan Miguel David Becerra, Montreal (CA); Matheus Lemes Ferronato, Abu Dhabi (AE)

(73) Assignee: HaiLa Technologies Inc., Montreal (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/606,819

(22) Filed: Mar. 15, 2024

Related U.S. Application Data (63) Continuation of application No. 18/543,764, filed on Dec. 18, 2023, now Pat. No. 11,962,412.

(51) Int. Cl.
*H04W 28/04* (2009.01)
*H04L 1/00* (2006.01)
*H04L 1/1607* (2023.01)

(52) U.S. Cl.
CPC .......... *H04L 1/1642* (2013.01); *H04L 1/0061* (2013.01); *H04W 28/04* (2013.01)

(58) Field of Classification Search
CPC ... H04L 1/0045; H04L 1/0064; H04L 1/0061; H04L 1/1642; H04W 28/04
See application file for complete search history.

(56) References Cited

U.S. PATENT DOCUMENTS

| | | | |
|---|---|---|---|
| 10,338,205 B2 | 7/2019 | Zhang et al. | |
| 2008/0150698 A1* | 6/2008 | Smith | G06K 19/0723 340/10.4 |
| 2013/0051375 A1* | 2/2013 | Chemishkian | H04W 88/04 370/338 |
| 2019/0059734 A1 | 2/2019 | Yamada | |
| 2019/0199451 A1 | 6/2019 | Krall et al. | |
| 2019/0274144 A1 | 9/2019 | Zhang et al. | |

(Continued)

*Primary Examiner* — Syed Ali
(74) *Attorney, Agent, or Firm* — SMART & BIGGAR LP; Isis E. Caulder; Sunil R. Rao (57) ABSTRACT

A method for preserving a frame check sequence (FCS) of a data frame during backscatter communication is provided. The method comprises: receiving a transmitted signal including a transmitted data frame, wherein the transmitted data frame includes a first data sequence and the FCS; determining a cyclic redundancy check (CRC) preservation sequence based on a backscattering tag data sequence, a bit-length of the backscattering tag data sequence, and a given CRC algorithm; and backscattering the transmitted signal to form a backscattered signal including a backscattered data frame, wherein the backscattered data frame includes a second data sequence and the FCS. The second data sequence includes a transmitted data sequence, an encoded tag data sequence and the CRC preservation sequence. The CRC preservation sequence preserves the FCS of the transmitted data frame in the backscattered data frame. The FCS is usable to detect communication errors in the backscattered data frame.

16 Claims, 5 Drawing Sheets

(56) References Cited

U.S. PATENT DOCUMENTS

| | | | |
|---|---|---|---|
| 2020/0284883 A1* | 9/2020 | Ferreira | G01S 17/10 |
| 2020/0400821 A1* | 12/2020 | Baker | G01S 7/4804 |
| 2021/0084251 A1 | 3/2021 | Gollakota et al. | |
| 2022/0061644 A1 | 3/2022 | Fontaine et al. | |
| 2023/0129498 A1 | 4/2023 | Bender | |
| 2023/0244883 A1 | 8/2023 | Nielsen et al. | |
| 2023/0283385 A1* | 9/2023 | Ip | H04B 10/80 |
| | | | 398/115 |
| 2023/0288549 A1* | 9/2023 | Wang | G01S 7/2923 |
| 2024/0313870 A1* | 9/2024 | Li | H04B 7/22 |
| 2024/0380482 A1* | 11/2024 | Henry | H04B 7/22 |

\* cited by examiner

METHOD AND SYSTEM FOR PRESERVING A FRAME CHECK SEQUENCE DURING BACKSCATTER COMMUNICATION

FIELD

The present subject-matter relates to backscatter communication systems and backscattering tags, and more particularly to a method and system for preserving a frame check sequence (FCS) of a data frame during backscatter communication.

BACKGROUND

Backscatter communication has attracted interest for applications such as implantable sensors, wearables, and smart home sensing because of its ability to offer low power connectivity to these sensors. Such applications have severe power constraints. Implantable sensors for example have to last for years, while even more traditional smart home monitoring applications may benefit from sensors and actuators that can last several years. Backscatter communication can satisfy the connectivity requirements while consuming such low power as to be energized by harvesting energy, or with batteries that could last several years.

Backscatter systems generally require specialized hardware to generate the excitation RF signals that backscatter radios can reflect, as well as to decode the backscattered signals. Recent research such as Wi-Fi backscatter to BackFi and passive Wi-Fi have reduced the need for specialized hardware. Passive Wi-Fi for example can decode using standard Wi-Fi radios, however it still requires a dedicated continuous wave signal generator as the excitation RF signal source. BackFi needs a proprietary full duplex hardware add-on to Wi-Fi radios to enable backscatter communication. Consequently, a need continues to exist for a backscatter system that can be deployed using commodity devices such as access points, smartphones, watches and tablets.

SUMMARY OF THE VARIOUS EMBODIMENTS

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In one broad aspect, there is provided a backscattering tag. The backscattering tag is configured to: receive a transmitted signal including a transmitted data frame, wherein the transmitted data frame includes a first data sequence and a frame check sequence (FCS), the first data sequence including a transmitted data sequence and a dummy sequence, the FCS being based on a first cyclic redundancy check (CRC) value determined using a given CRC algorithm for the first data sequence, and the FCS being usable by a receiver to detect communication errors in the transmitted data frame; determine a CRC preservation sequence based on a backscattering tag data sequence, a bit-length of the backscattering tag data sequence, and the given CRC algorithm; and backscatter the transmitted signal to form a backscattered signal including a backscattered data frame, wherein the backscattered data frame includes a second data sequence and the FCS, the second data sequence including the transmitted data sequence, an encoded tag data sequence and the CRC preservation sequence, the CRC preservation sequence preserving the FCS of the transmitted data frame in the backscattered data frame by yielding the first CRC value using the given CRC algorithm for the second data sequence, and the FCS being usable by the receiver to detect communication errors in the backscattered data frame.

In some embodiments, the dummy sequence is a sequence of multiple zeroes with a bit-length at least equal to a sum of bit-lengths of the backscattering tag data sequence and the CRC preservation sequence.

In some embodiments, the backscattering tag is configured to backscatter the transmitted signal to form a backscattered signal by modifying at least a portion of the dummy sequence in the transmitted data frame to include the encoded tag data sequence and the CRC preservation sequence in the backscattered data frame.

In some embodiments, the backscattering tag is configured to determine the CRC preservation sequence by: determining a second CRC value of the backscattering tag data sequence using the given CRC algorithm; determining a third CRC value of a bit sequence of zeros with bit-length equal to the bit-length of the backscattering tag data sequence using the given CRC algorithm; determining an intermediate sequence by performing a XOR operation of the second CRC value with the third CRC value; and reversing bit sequence of the intermediate sequence to form the CRC preservation sequence.

In some embodiments, the backscattering tag data sequence includes sensor data generated by a sensor coupled to the backscattering tag.

In some embodiments, the backscattering tag is configured to backscatter the transmitted signal to form the backscattered signal by modifying a frequency of the transmitted signal to encode data.

In some embodiments, the backscattering tag is configured to backscatter the transmitted signal to form the backscattered signal by modifying an amplitude and/or a phase of the transmitted signal to encode data.

In some embodiments, the transmitted signal is compliant with an IEEE 802.11 standard and the transmitted data frame comprises: a MAC header; a payload including the first data sequence; and the FCS.

In some embodiments, the backscattered signal is compliant with an IEEE 802.11 standard and the backscattered data frame comprises: a MAC header; a payload including the second data sequence; and the FCS.

In another broad aspect, there is provided a method for preserving a frame check sequence (FCS) of a data frame during backscatter communication. The method comprises: receiving, by a backscattering tag, a transmitted signal including a transmitted data frame, wherein the transmitted data frame includes a first data sequence and the FCS, the first data sequence including a transmitted data sequence and a dummy sequence, the FCS being based on a first cyclic redundancy check (CRC) value determined using a given CRC algorithm for the first data sequence, and the FCS being usable by a receiver to detect communication errors in the transmitted data frame; determining, by the backscattering tag, a CRC preservation sequence based on a backscattering tag data sequence, a bit-length of the backscattering tag data sequence, and the given CRC algorithm; and backscattering, by the backscattering tag, the transmitted signal to form a backscattered signal including a backscattered data frame, wherein the backscattered data frame includes a second data sequence and the FCS, the second data sequence including the transmitted data sequence, an encoded tag data sequence and the CRC preservation sequence, the CRC preservation sequence preserving the FCS of the transmitted data frame in the backscattered data frame by yielding the first CRC value using the given CRC algorithm for the second data sequence, and the FCS being usable by the receiver to detect communication errors in the backscattered data frame.

In some embodiments, the dummy sequence is a sequence of multiple zeroes with a bit-length at least equal to a sum of bit-lengths of the backscattering tag data sequence and the CRC preservation sequence.

In some embodiments, the backscattering includes modifying at least a portion of the dummy sequence in the transmitted data frame to include the encoded tag data sequence and the CRC preservation sequence in the backscattered data frame.

In some embodiments, determining the CRC preservation sequence includes: determining a second CRC value of the backscattering tag data sequence using the given CRC algorithm; determining a third CRC value of a bit sequence of zeros with bit-length equal to the bit-length of the backscattering tag data sequence using the given CRC algorithm; determining an intermediate sequence by performing a XOR operation of the second CRC value with the third CRC value; and reversing bit sequence of the intermediate sequence to form the CRC preservation sequence.

In some embodiments, the backscattering tag data sequence includes sensor data generated by a sensor coupled to the backscattering tag.

In some embodiments, backscattering the transmitted signal to form the backscattered signal includes encoding data by modifying a frequency of the transmitted signal.

In some embodiments, backscattering the transmitted signal to form the backscattered signal includes encoding data by modifying an amplitude and/or a phase of the transmitted signal.

In some embodiments, the transmitted signal is compliant with an IEEE 802.11 standard and the transmitted data frame comprises: a MAC header; a payload including the first data sequence; and the FCS.

In some embodiments, the backscattered signal is compliant with an IEEE 802.11 standard and the backscattered data frame comprises: a MAC header; a payload including the second data sequence; and the FCS.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Further aspects and features of the example embodiments described herein will appear from the following description taken together with the accompanying drawings.

DESCRIPTION OF VARIOUS EMBODIMENTS

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

In the description and drawings herein, reference may be made to a Cartesian co-ordinate system in which the vertical direction, or z-axis, extends in an up and down orientation from bottom to top. The x-axis extends in a first horizontal or width dimension perpendicular to the z-axis, and the y-axis extends cross-wise horizontally relative to the x-axis in a second horizontal or length dimension.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Embodiments herein provide a system and method of backscattered communication that is complaint with existing communications protocols, such as IEEE802.11 WLAN, Bluetooth, and ZigBee. To this end, it will be noted that, while for simplicity and ease of description, embodiments herein reference communication via IEEE802.11 1 Mbps DSSS compliant frames, the described embodiments are not so limited such that the disclosed backscatter communication systems may operate with other similar communication standards.

The disclosed systems and methods can enable preservation of the FCS of a data frame during backscatter communication, i.e., the same FCS can be used for error detection in the original transmitted frame and the backscattered frame. This can enable backscattering communications systems to be transmitter/receiver agnostic and be operable on different communication infrastructures. For example, the FCS preservation can enable the backscatter communication to operate on any WLAN network infrastructure.

Figure 1:
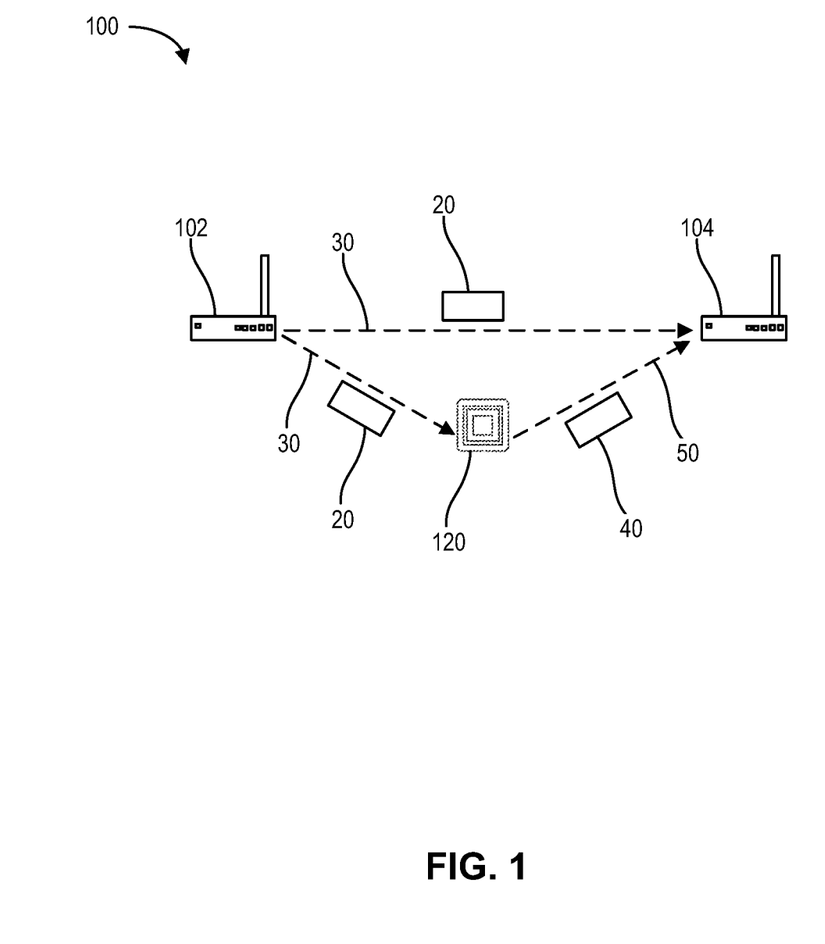
FIG. 1 is a simplified schematic diagram of a backscatter communication system, in accordance with an example embodiment.

Reference is now made to FIG. 1, which is a simplified schematic diagram of a backscatter communication system 100, in accordance with an example embodiment. System 100 includes a transmitting unit 102, a receiving unit 104 and a backscattering tag 120. It will be understood that, in some embodiments, one or more of the transmitting and receiving units may in-fact comprise a device with combined transmitting and receiving functionalities.

Transmitting unit 102 may be configured to transmit a signal 30 that includes one or more transmitted data frames 20. Transmitting unit 102 may transmit data frames 20 at a pre-defined or controllable frequency. To this end, transmitting unit 102 may also be referred to herein as an "excitation device", and transmitted signal 30 may also be referred to herein as an "excitation signal". In some embodiments, transmitting unit 102 may transmit signal 30 in response to an input trigger.

Transmitted signal 30 may be an IEEE802.11 compliant WLAN signal and transmitted data frames 20 may be IEEE802.11 compliant WLAN data frames. Transmitting unit 102 may include, for example, a mobile phone with a standard Wi-Fi radio. In other examples, transmitting unit 102 may be any other device configured to communicate via a Wi-Fi radio. In some embodiments, transmitted signal 30 may not be an IEEE802.11 compliant WLAN signal. For example, transmitted signal 30 may comply with any other suitable wireless communication standard.

Receiving unit 104 may be any suitable device configured to receive transmitted signal 30. Receiving unit 104 may be operable at multiple frequencies, including the frequency of transmitted signal 30. Receiving unit 104 may operate at a pre-defined frequency or may be tuned to different frequencies. In some embodiments, receiving unit 104 may be a device capable of receiving IEEE802.11 compliant WLAN signals. For example, receiving unit 104 may include a Wi-Fi access point, or any other suitable Wi-Fi reception device.

Backscattering tag 120 may be any suitable device that operates to intercept transmitted data frames 20. In particular, backscattering tag 120 may be configured to manipulate the intercepted frames so as to encode the backscattering tag's own data. Backscattering tag 120 may backscatter transmitted signal 30 to form a backscattered signal 50 that includes one or more backscattered data frames 40. Backscattered data frames 40 may include the backscattering tag's own data.

In more detail, backscattering tag 120 may receive a transmitted data frame containing data transmitted by transmitting unit 102. Backscattering tag 120 may operate to manipulate the originally transmitted data to include the backscattering tag's own data in the backscattered data frame.

In some embodiments, transmitted signal 30 may be an IEEE802.11 compliant WLAN signal. Backscattering tag 120 may be configured such that backscattered signal 50 is an 802.11b compliant Wi-Fi signal and backscattered data frames 40 are 802.11b compliant Wi-Fi data frames.

Backscattering tag 120 may apply different methods to manipulate transmitted signal 30 to generate backscattered signal 50. For example, as described in U.S. Pat. No. 10,338,205 to Zhang et al, filed Aug. 14, 2017 and issued Jul. 2, 2019; and United States Publication No. 2019/0274144 to Zhang et al, filed Apr. 25, 2019, both of which are hereby incorporated by reference in their entirety, a code word translation scheme can be used. The codeword translation may involve, for example, XOR'ing the data bits in the original transmitted payload of transmitted signal 30 with backscattering tag 120's data, to generate backscattered signal 50. In practice, codeword translation may be performed by modifying, for example, the amplitude, phase and/or frequency of transmitted signal 30 received at backscattering tag 120.

To this end, backscattering tag 120 may include various passive circuitry components that operate (i.e., manipulate) on the received signal to encode the received signal with backscattering tag 120's own data. Various architectures and configurations for the passive circuitry for backscattering tags are known in the art.

Backscattering tag 120's own data, that is encoded into backscattered data frames 40, may vary based on the application of backscatter communication system 100. For example, backscattering tag 120 may be coupled to a sensor and backscattering tag 120's own data may include sensor data generated by the sensor. In this manner, backscattering tag 120 may facilitate implementation of ultra-low-power sensor networks.

In some embodiments, backscattered signal 50 may be in the same frequency channel as original transmitted signal 30. In turn, receiving unit 104 may receive both original transmitted signal 30, as well as backscattered signal 50, on a single frequency channel. The ability of receiving unit 104 to decode backscattered signal 50 to recover the data encoded by backscattering tag 120 may be degraded by the interference generated by receiving signals 30 and 50 in the same frequency channel.

In some embodiments, to at least partially mitigate the interference issue, receiving unit 104 may include two receivers that are tuned to listen (i.e., receive) frames on separate frequency channels. Transmitting unit 102 may transmit data frames 20 on a first frequency channel. A first receiver of the two receivers of receiving unit 104 is tuned to the first frequency channel to receive transmitted data frames 20. Backscattering tag 120 may be configured to, in addition to encoding the backscattering tag's own data into the backscattered data frame, frequency shift backscattered signal 50 onto a different frequency. In this manner, backscattering tag 120 can generate a frequency-shifted backscattered signal 50. A second receiver of the two receivers of receiving unit 104 is tuned to the second frequency channel to receive backscattered data frames 40.

Receiving unit 104 may be configured to process the data in received backscattered data frames 40 to decode and isolate (i.e., disentangle) backscattering tag 120's own data from the original transmitted data. In some embodiments, the decoding may be performed by an external device (e.g., a decoding block) connected to receiving unit 104.

Here as well, various example methods for decoding and recovering backscattering tag 120's own data will occur to the skilled artisan. For example, as described in U.S. Pat. No. 10,338,205 to Zhang et al. and United States Publication No. 2019/0274144 to Zhang et al.—the decoding may involve reversing the XOR operation performed by backscattering tag 120, and using an XOR decoder. The XOR decoder XORs the data bits in a backscattered data frame 40 with the data bits in the original transmitted data frame 20 to recover the data bits associated with the backscattering tag's own data.

In some embodiments, transmitting unit 102 may transmit—at pre-defined time or frequency interval-transmitted data frames 20 having pre-defined transmitted data. That is, the transmitted data is known, apriori, to receiving unit 104 (i.e., it is pre-defined from the receiver's perspective). For example, the transmitted data may include a known sequence of bits at a known bit location within transmitted data frame 20. In this manner, receiving unit 104 (or a decoding block connected to receiving unit 104) is not required to rely on the data in the originally transmitted data frame 20 to decode backscattered data frame 40. Methods and systems for backscatter communication using pre-defined templates are described in United States Patent Publication No. 2023/0244883 to Nielsen et al., filed Jan. 27, 2023, which is hereby incorporated by reference in its entirety.

Figure 2:
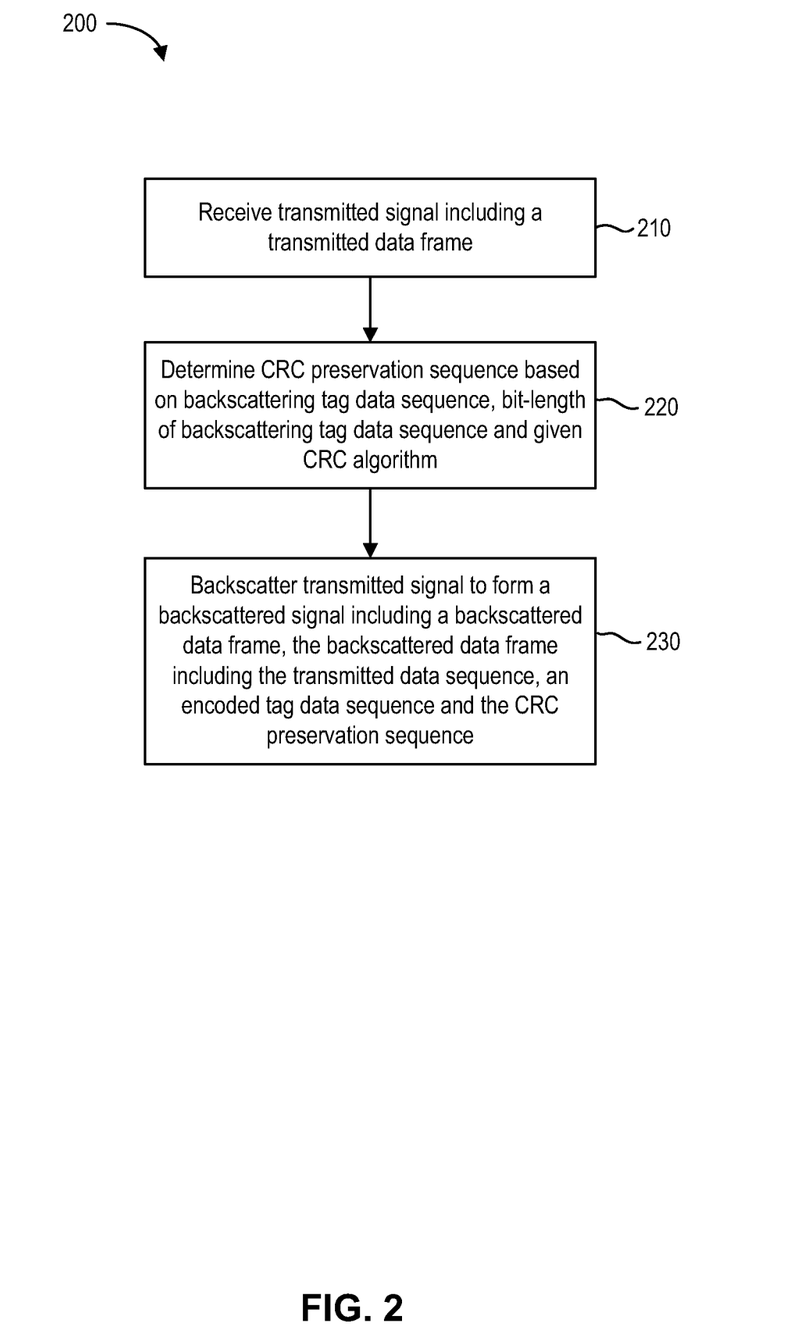
FIG. 2 is a process flow for an example embodiment of a method for preserving a FCS of a data frame during backscatter communication.

Reference is now made to FIG. 2, which is a process flow for an example embodiment of a method 200 for preserving a FCS of a data frame during backscatter communication. Method 200 may be performed, for example, by backscatter communication system 100 and concurrent reference is made to FIG. 1 in the description below.

At act 210, a transmitted signal including a transmitted data frame may be received. For example, transmitting unit 102 may transmit signal 30 and backscattering tag 120 may receive transmitted signal 30.

Figure 3:
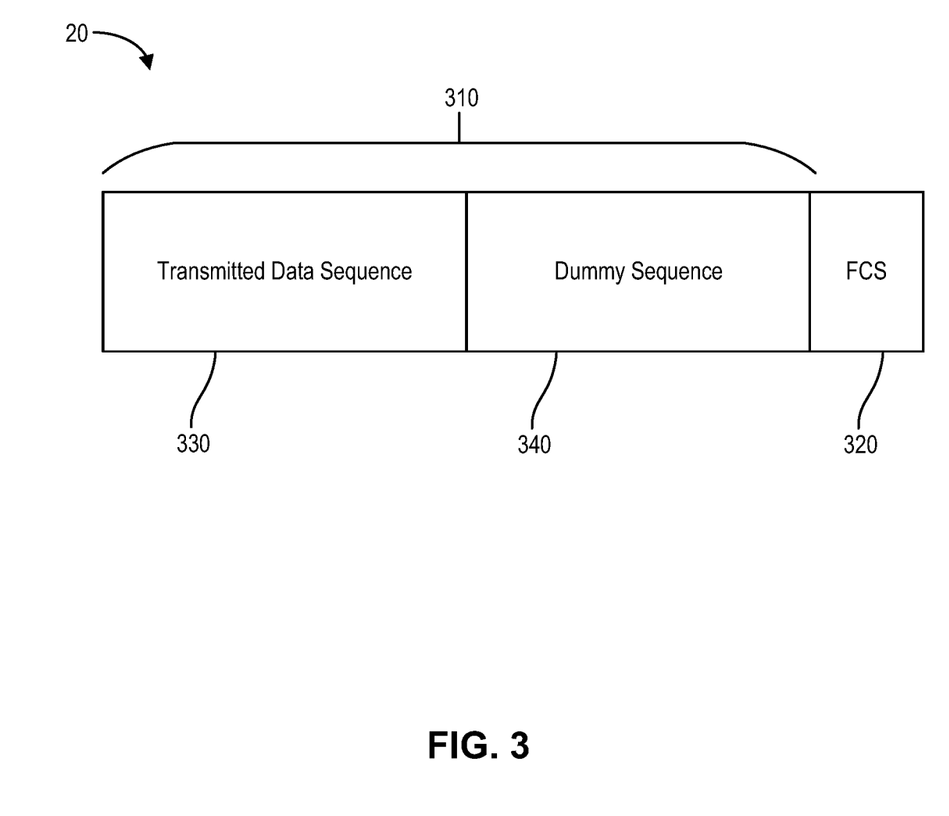
FIG. 3 is a block diagram of an example transmitted data frame received during the method of FIG. 2.

Transmitted signal 30 may include one or more transmitted data frames 20. A transmitted data frame 20 may include a first data sequence and a FCS. Reference is now made to FIG. 3, which is a block diagram of an example transmitted data frame 20 that may be received at act 210. In the illustrated example, transmitted data frame 20 includes a first data sequence 310 and a FCS 320.

In some embodiments, first data sequence 310 may include a transmitted data sequence 330 and a dummy sequence 340. Transmitted data sequence may include data being transmitted from a transmitter (e.g., transmitting unit 102) to a receiver (e.g., receiving unit 104). Dummy sequence 340 may include a portion of the first data sequence that is modified by a backscattering tag to encode the backscattering tag's own data. In some embodiments, dummy sequence 340 may be known, apriori, to the receiver (e.g., receiving unit 104). For example, dummy sequence 340 may include a sequence of multiple "0" bits. During backscattering, a backscattering tag may modify at least a portion of dummy sequence 340 to encode the backscattering tag's own data.

FCS 320 may be usable by a receiver of the transmitted signal to detect communication errors in transmitted data frames that are received at the receiver. For example, receiving unit 104 may use FCS 320 to detect errors in transmitted data frames 20 that are received at receiving unit 104.

Any suitable techniques may be used for implementing the FCS. For example, the FCS may be a cyclic redundancy check (CRC) value determined using any suitable CRC algorithm. For any transmitted data frame 20, the CRC algorithm can generate a first CRC value for first data sequence 310 and FCS 320 may include the first CRC value.

In some embodiments, the transmitted signal received at act 210 is compliant with an IEEE 802.11 standard. Each transmitted data frame 20 may include a MAC header, a payload including first data sequence 310, and FCS 320.

At act 220, a CRC preservation sequence may be determined. The FCS may be rendered invalid when a backscattering tag modifies the content of a transmitted data frame to encode the backscattering tag's own data. To mitigate this issue and to ensure that the same FCS can be valid for both transmitted data frame 20 and backscattered data frame 40, backscattering tag 120 may determine a CRC preservation sequence and include the CRC preservation sequence in the backscattered data frame.

Backscattering tag 120 may determine the CRC preservation sequence based on a backscattering tag data sequence to be encoded in the backscattered data frame. The backscattering tag data sequence may include, for example, sensor data generated by a sensor coupled to the backscattering tag.

In some embodiments, backscattering tag 120 may determine the CRC preservation sequence by determining a second CRC value for the backscattering tag data sequence. At act 220, the backscattering tag uses the same CRC algorithm as that used at act 210. Further, backscattering tag 120 may determine a third CRC value for a bit sequence of zeros with bit-length equal to the bit-length of the backscattering tag data sequence. Backscattering tag 120 may then determine an intermediate sequence by performing a XOR operation of the second CRC value with the third CRC value. Further, backscattering tag 120 may reverse the bit sequence of the intermediate sequence to form the CRC preservation sequence.

At act 230, the transmitted signal may be backscattered to form a backscattered signal. For example, backscattering tag 120 may backscatter transmitted signal 30 to form backscattered signal 50.

Figure 4A:
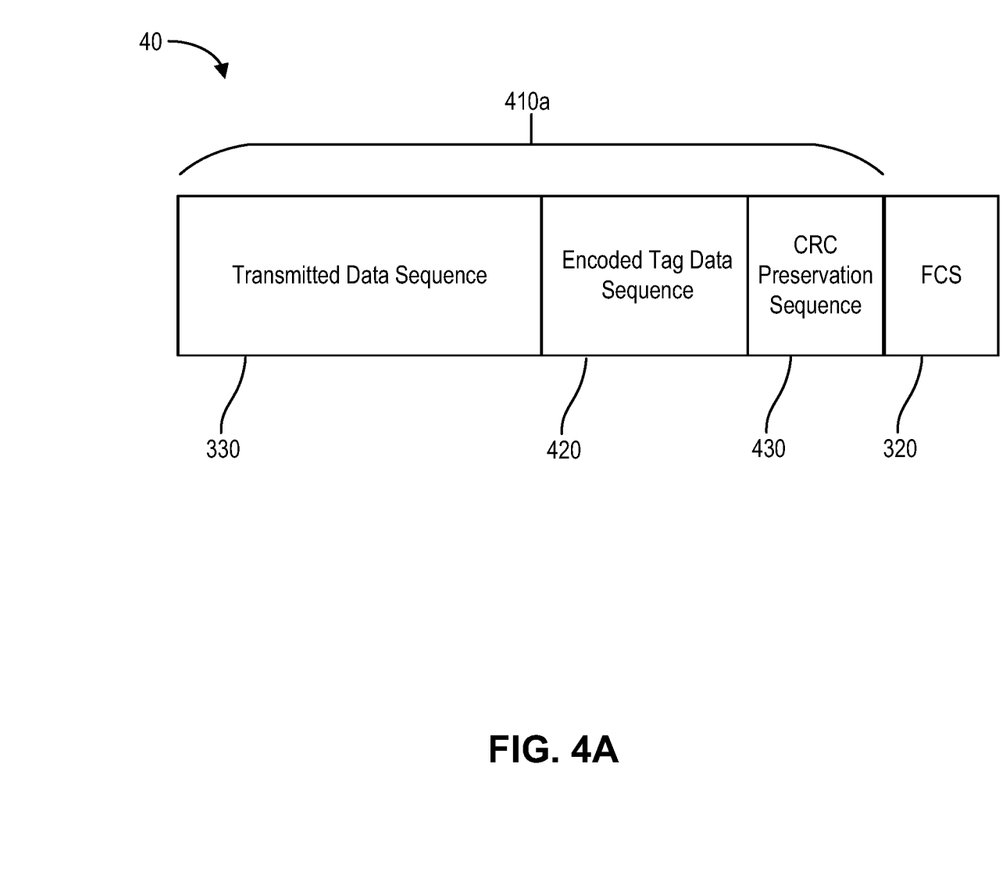
FIG. 4A is a block diagram of an example backscattered data frame backscattered during the method of FIG. 2.
Figure 4B:
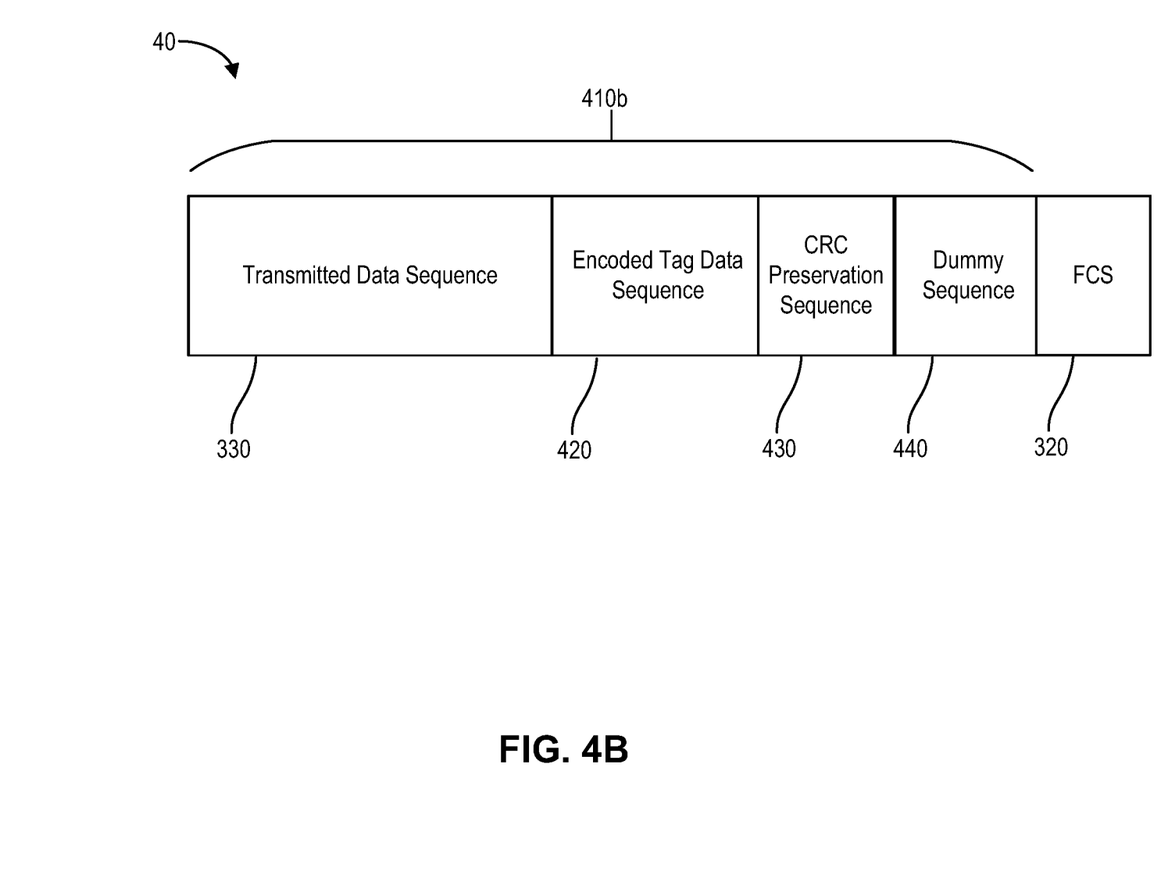
FIG. 4B is a block diagram of another example backscattered data frame backscattered during the method of FIG. 2.

Backscattered signal 50 may include one or more backscattered data frames 40. A backscattered data frame 40 may include a second data sequence and the FCS. Reference is now made to FIGS. 4A and 4B, which are block diagrams of example backscattered data frames 40. In the illustrated examples, backscattered data frame 40 includes a second data sequence 410 (e.g., second data sequence 410a shown in FIG. 4A and second data sequence 410b shown in FIG. 4B) and the FCS 320. Concurrent reference is also made to FIGS. 1-3.

In some embodiments, the backscattered signal at act 230 is compliant with an IEEE 802.11 standard. Each backscattered data frame 40 may include a MAC header, a payload including second data sequence 410, and FCS 320.

In some embodiments, second data sequence 410 may include the transmitted data sequence 330, an encoded tag data sequence 420 and a CRC preservation sequence 430. Transmitted data sequence 330 may be unmodified data included in transmitted data frame 20 that was received at act 210. The CRC preservation sequence 430 can be the CRC preservation sequence determined at act 220.

Backscattering tag may modify at least a portion of dummy sequence 340 of transmitted data frame 20 to include encoded tag data sequence 420 and CRC preservation sequence 430 in backscattered data frame 40. The bit-length of dummy sequence 340 may be at least equal to a sum of bit-lengths of the backscattering tag data sequence and the CRC preservation sequence.

For example, FIG. 4A shows an example where the bit-length of dummy sequence 340 is equal to a sum of bit-lengths of the backscattering tag data sequence and the CRC preservation sequence. In this case, the dummy sequence is completely replaced by encoded tag data sequence 420 and CRC preservation sequence 430 in second data sequence 410a of backscattered data frame 40.

As another example, FIG. 4B shows an example where the bit-length of dummy sequence 340 is greater than a sum of bit-lengths of the backscattering tag data sequence and the CRC preservation sequence. In this case, second data sequence 410b of backscattered data frame 40 includes encoded tag data sequence 420, CRC preservation sequence 430 and a dummy sequence 440. Dummy sequence 440 may include an unmodified portion of dummy sequence 340. For an example dummy sequence 340 including a sequence of multiple "0" bits with a bit-length greater than a sum of bit-lengths of the backscattering tag data sequence and the CRC preservation sequence, dummy sequence 440 includes a sequence of multiple "0" bits with a bit-length less than the bit-length of dummy sequence 340.

Backscattering tag 120 may use any suitable method to modify the transmitted signal/data frame to form the backscattered signal/data frame. For example, backscattering tag 120 may modify an amplitude, a phase and/or a frequency of the transmitted signal to encode the backscattering tag's own data and form the backscattered signal. In some embodiments, backscattering tag 120 may frequency-shift the backscattered signal, for example, using passive circuitry components and methodologies as described in U.S. Pat. No. 10,338,205 to Zhang et al. and United States Patent Publication No. 2019/0274144 to Zhang et al. This may be performed to avoid interference between the backscattered signal and the original transmitted signal.

Method 200 can enable preservation of the FCS because the same FCS 320 (included in transmitted data frame 20) is usable by a receiver of backscattered data frame 40 to detect communication errors. For example, receiving unit 104 may use FCS 320 to detect errors in any portion of second data sequence 410 (e.g., transmitted data sequence 330, encoded tag data sequence 420). If there are no communication errors associated with backscattered data frame 40, the same CRC algorithm (that was used at acts 210 and 220) yields the same first CRC value for second data sequence 410 (as for first data sequence 310).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

We claim:

1. A communication system comprising:
 a memory storing processor-executable instructions;
 a processor communicatively coupled to the memory;
 a transmitting unit comprising a radio transmitter for transmitting a signal including a transmitted data frame;
 a backscattering tag including one or more passive circuitry components and coupled to a sensor, the backscattering tag configured to:
  receive, using the one or more passive circuitry components, the transmitted signal including the transmitted data frame;
  receive sensor data from the sensor; and
  backscatter, using the one or more passive circuitry components, the transmitted signal to form a backscattered signal including a backscattered data frame that includes encoded sensor data; and
 a receiving unit comprising a radio receiver for receiving the backscattered signal, the receiving unit being configured to:
  decode the encoded sensor data,
 wherein the transmitted data frame includes a first data sequence and a frame check sequence (FCS),
  the first data sequence including a transmitted data sequence and a dummy sequence,
  the FCS being based on a first cyclic redundancy check (CRC) value determined using a given CRC algorithm for the first data sequence, and
  the FCS being usable by the receiving unit to detect communication errors in the transmitted data frame; and
 the backscattered data frame includes a MAC header, a payload including the second data sequence and the FCS,
  the second data sequence including the transmitted data sequence, an encoded tag data sequence and a CRC preservation sequence based on—
   i) a backscattering tag data sequence including the encoded sensor data,
   ii) a bit-length of the backscattering tag data sequence, and iii) the given CRC algorithm,
  the CRC preservation sequence preserving the FCS of the transmitted data frame in the backscattered data frame by yielding the first CRC value using the given CRC algorithm for the second data sequence, and
  the FCS being usable by the receiving unit to detect communication errors in the backscattered data frame.

2. The communication system of claim 1, wherein the dummy sequence is a sequence of multiple zeroes transmitted by the transmitting unit, a bit-length of the dummy sequence being at least equal to a sum of bit-lengths of the backscattering tag data sequence and the CRC preservation sequence backscattered by the backscattering tag using the one or more passive circuitry components.

3. The communication system of claim 1, wherein the backscattering tag is configured to backscatter the transmitted signal, using the one or more passive circuitry components, to form a backscattered signal by modifying at least a portion of the dummy sequence in the transmitted data frame to include the encoded tag data sequence and the CRC preservation sequence in the backscattered data frame.

4. The communication system of claim 1, wherein the backscattering tag is configured to determine the CRC preservation sequence by:
 determining a second CRC value of the backscattering tag data sequence using the given CRC algorithm;
 determining a third CRC value of a bit sequence of zeros with bit-length equal to the bit-length of the backscattering tag data sequence using the given CRC algorithm;
 determining an intermediate sequence by performing a XOR operation of the second CRC value with the third CRC value; and
 reversing bit sequence of the intermediate sequence to form the CRC preservation sequence.

5. The communication system of claim 1, wherein the backscattering tag is configured to backscatter the transmitted signal to form the backscattered signal by modifying a frequency of the transmitted signal to encode data.

6. The communication system of claim 1, wherein the backscattering tag is configured to backscatter the transmitted signal to form the backscattered signal by modifying an amplitude and/or a phase of the transmitted signal to encode data.

7. The communication system of claim 1, wherein the transmitted signal is compliant with an IEEE 802.11 standard and the transmitted data frame comprises:
   a MAC header;
   a payload including the first data sequence; and
   the FCS.

8. The communication system of claim 1, wherein the backscattered signal is compliant with an IEEE 802.11 standard.

9. A method for preserving a frame check sequence (FCS) of a data frame during backscatter communication, the method comprising:
   transmitting, by a radio transmitter of a transmitting unit, a signal including a transmitted data frame;
   receiving, by a backscattering tag, the transmitted signal including the transmitted data frame;
   receiving, by the backscattering tag from a sensor coupled to the backscattering tag, sensor data;
   backscattering, by the backscattering tag, the transmitted signal to form a backscattered signal including a backscattered data frame that includes encoded sensor data; and
   receiving, by a radio receiver of a receiving unit, the backscattered signal, the receiving unit being configured to decode the encoded sensor data,
   wherein the transmitted data frame includes a first data sequence and the FCS,
      the first data sequence including a transmitted data sequence and a dummy sequence,
      the FCS being based on a first cyclic redundancy check (CRC) value determined using a given CRC algorithm for the first data sequence, and
      the FCS being usable by the receiving unit to detect communication errors in the transmitted data frame; and
   the backscattered data frame includes a MAC header, a payload including the second data sequence and the FCS,
      the second data sequence including the transmitted data sequence, an encoded tag data sequence and a CRC preservation sequence based on i) a backscattering tag data sequence including the encoded sensor data, ii) a bit-length of the backscattering tag data sequence, and iii) the given CRC algorithm,
      the CRC preservation sequence preserving the FCS of the transmitted data frame in the backscattered data frame by yielding the first CRC value using the given CRC algorithm for the second data sequence, and
      the FCS being usable by the receiving unit to detect communication errors in the backscattered data frame.

10. The method of claim 9, wherein the dummy sequence is a sequence of multiple zeroes with a bit-length at least equal to a sum of bit-lengths of the backscattering tag data sequence and the CRC preservation sequence.

11. The method of claim 9, wherein said backscattering includes modifying at least a portion of the dummy sequence in the transmitted data frame to include the encoded tag data sequence and the CRC preservation sequence in the backscattered data frame.

12. The method of claim 9, wherein determining the CRC preservation sequence includes:
   determining a second CRC value of the backscattering tag data sequence using the given CRC algorithm;
   determining a third CRC value of a bit sequence of zeros with bit-length equal to the bit-length of the backscattering tag data sequence using the given CRC algorithm;
   determining an intermediate sequence by performing a XOR operation of the second CRC value with the third CRC value; and
   reversing bit sequence of the intermediate sequence to form the CRC preservation sequence.

13. The method of claim 9, wherein backscattering the transmitted signal to form the backscattered signal includes encoding data by modifying a frequency of the transmitted signal.

14. The method of claim 9, wherein backscattering the transmitted signal to form the backscattered signal includes encoding data by modifying an amplitude and/or a phase of the transmitted signal.

15. The method of claim 9, wherein the transmitted signal is compliant with an IEEE 802.11 standard and the transmitted data frame comprises:
   a MAC header;
   a payload including the first data sequence; and
   the FCS.

16. The method of claim 9, wherein the backscattered signal is compliant with an IEEE 802.11 standard.

* * * * *